Patented Aug. 9, 1932

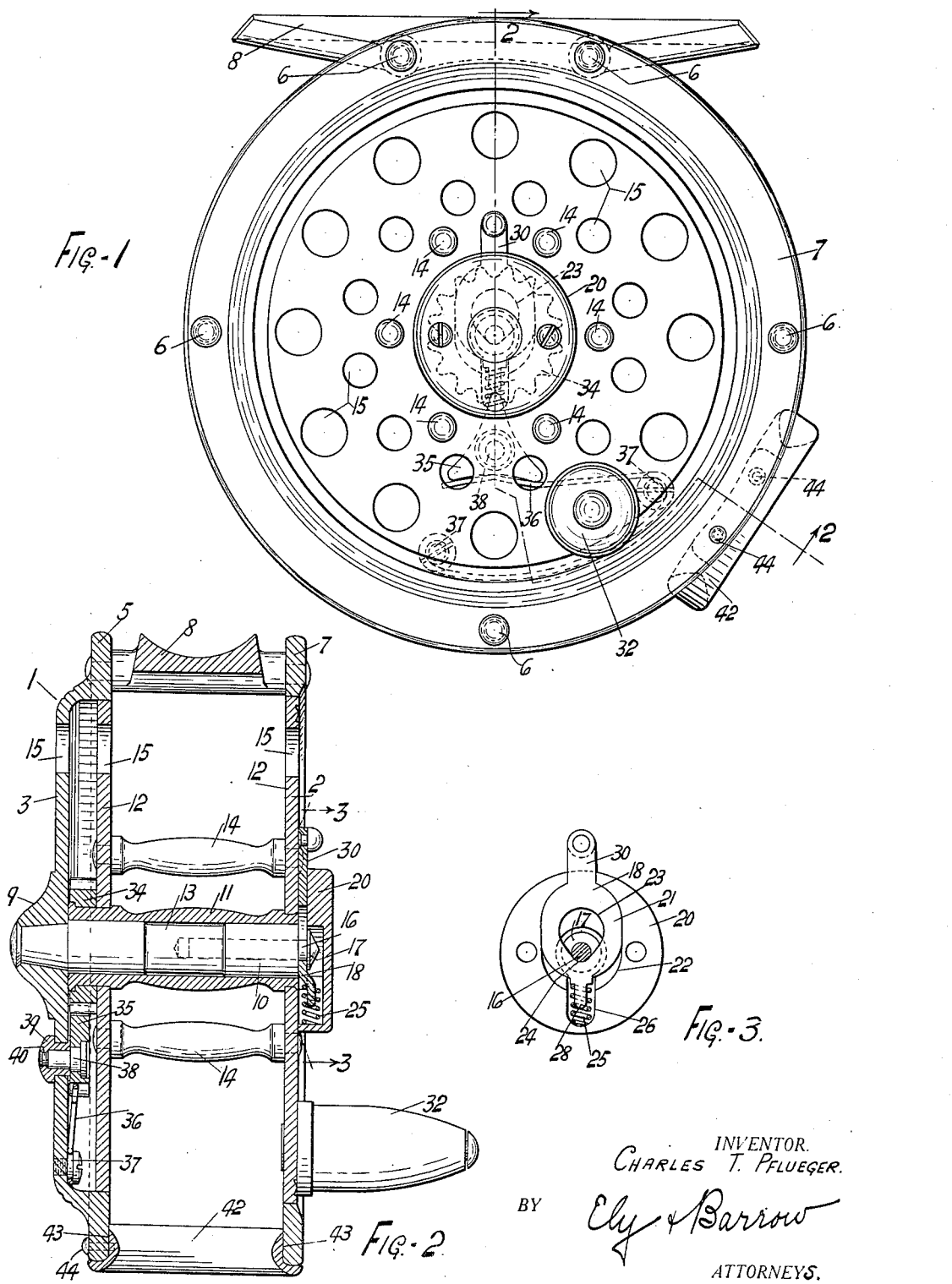

1,871,386

UNITED STATES PATENT OFFICE

CHARLES T. PFLUEGER, OF AKRON, OHIO, ASSIGNOR TO THE ENTERPRISE MANUFACTURING COMPANY, OF AKRON, OHIO, A CORPORATION OF OHIO

FISHING REEL

Application filed October 27, 1928, Serial No. 315,416. Renewed April 28, 1932.

The present invention relates to fishing reels and particularly to that type of reel known in the trade as "trout reels."

The objects of the invention are to improve upon the construction and operation of these reels, to make the same economically, and to provide for ready disassembly of the reel structure. It is also an object to improve upon the line guide mechanism in this type of reel and upon the click mechanism, as will be more fully set forth in the detailed description of the invention.

The special features of improved reel are fully and completely set out in the drawing and description, but it will be understood that the invention is not necessarily limited to such details and may be varied or modified within the scope of the invention as set forth in the claims.

In the drawing:

Figure 1 is a side view of the complete reel;

Figure 2 is a sectional view thereof on the line 2—2 of Figure 1; and

Figure 3 is a section on the line 3—3 of Figure 2.

The reel structure consists of a frame or housing 1 and a spool or reel 2 removably associated therewith. The frame comprises a main or base plate 3 composed of metal, preferably aluminum, for the sake of lightness of construction. The main body of the base plate is offset or recessed to provide a recess or housing for the click mechanism, the outer rim or edge of the reel being raised, as shown at 5, from which project a series of pillars 6 supporting the ring 7. Two of the pillars are provided with a reel seat 8 by which the reel is attached to the rod.

The center of the plate 3 is provided with a boss 9, in which is fitted the tapered end of a post 10, the inner end of which is riveted over as shown. The post is relieved at 13, forming a bearing for the hub 11 of the spool 2, the latter being composed of two plates 12 spaced apart by a series of pillars 14 which form the base or support upon which the line is wound. The base plate 3 and the spool plates 12 are provided with a plurality of perforations 15 which serve to lighten and ventilate the reel structure. The post 10 is preferably made of non-corrosive metal, so that the spool will run freely thereon.

The outer end of the post 10 is provided with a pin 16 made of hardened steel or similar metal for wearing purposes. The pin 16 has a cone-shaped head 17 and the surface of the reel is provided with a latch 18 adapted to engage with the pin and snap in position behind the head 17 and thereby hold the spool in place in the reel with the outer plate 12 flush with the ring 7. The latch 18 is located within a housing 20 attached to the face of the reel plate 12 and held in position thereby against the side of the spool. It is in the form of an oval-shaped plate or slide 21 seated in an elongated oval-shaped recess 22 on the under side of the housing 20. The central portion of the slide is provided with an opening 23 which is large enough to pass over the post when in one position, the opening having a reduced portion 24 adapted to fit against the side of the stud and beneath the head 17 when the latch is in locked position. The latch is yieldingly maintained in locked position by a light coil spring 25 seated in a recess 26 opening into the recess 22, the spring surrounding a tail piece 28 on the end of the latch. The latch extends beyond the housing opposite the spring and is provided with a finger 30 by which it may be moved inwardly to free the latch from locking engagement with the post, thereby permitting the spool to be lifted off the shaft 10. The reel is thus easily taken apart, and, when assembled, the latch will snap over the mushroom headed locking formation on the post.

A handle 32 is secured to the front plate 12 of the spool, whereby the spool may be rotated.

At the inner face or the under side of the spool, the hub 11 is extended and about this extended end of the hub is secured the click ratchet 34 which is engaged by the pawl 35. The pawl 35 is substantially triangular in form, a corner of the pawl engaging the click ratchet. The sides of the pawl, instead of being straight as is usual in mechanisms of this character, are curved inwardly for the purpose of engagement with a bent free end of a light wire spring 36, which is passed around binding posts 37 on the inside of the reel housing. The purpose of forming the pawl with the curved or inwardly bowed sides, and forming the spring with a correspondingly or substantially similarly shaped operative bearing portion, is to prevent sticking or holding of the pawl out of engagement with the ratchet. In former click mechanisms of this type, it has been customary to form the pawl with straight sides, the spring being correspondingly flattened, with the result that pawl is frequently caught in inoperative position. The curved spring and sides of the pawl prevent this occurring.

Attention is directed to the manner in which the pawl is pivoted to the reel housing. The headed pin 38 forms the pivot for the pawl, the reduced end of the pin being received in a bushing 39. The outer end of the pin is provided with a groove 40 in which the metal of the bushing is burnished to secure the parts in assembled position. This makes a very secure fastening for the pawl.

The line guide is formed by a metal ring 42 seated between the plate 5 and the ring 7, the sides of the ring being cut away as shown at 43 to fit against the flat surfaces. Pins 44 are driven in from the sides of the reel structure to hold the ring firmly in position.

It will be appreciated that an extremely light, yet strong, simple and economical structure has been provided. The spool is easily removed from the housing and the whole structure is composed of few parts which cannot readily be gotten out of order.

What is claimed is:

1. In a fishing reel, a spool, a click ratchet on the spool, a reel frame, a pawl pivoted on the frame, said pawl adapted to engage the ratchet, and a spring bearing against the pawl, the surface of the pawl engaged by the spring being concave, the end portion of the spring being complementally curved to fit the surface of the pawl.

2. In a fishing reel, a spool, a click ratchet on the spool, a reel frame, a pawl pivoted on the frame and engaging the ratchet, the said pawl being substantially triangular in shape with concave sides, and a spring secured to the frame and bearing against the pawl, the end portion of the spring being complementally arcuate to fit within a curved side of said pawl.

3. In a fishing reel, two annular spaced frame members having opposed flat surfaces, a line guide located between the frame members, the sides of said guide being flattened to fit against the said surfaces, and means for fixedly attaching the guide to the respective frame members.

4. In a fishing reel, two annular spaced frame members having opposed flat surfaces, an annular line guide located between the frame members and having its outer surface overlapping the frame members, chordal portions of said guide being cut away to fit against the opposed surfaces of the frame members, and means for fixedly securing the guide to the respective frame members.

5. In a fishing reel of the type described, a rear frame member, a post projecting from the frame member, a spool rotatably mounted on the post and removable endwise thereof, the post being of non-corrosive metal to insure free rotation of the spool, a pin of hardened metal projecting from the post and having a locking formation on its outer end, and a latch carried by the spool and engageable with the formation.

CHARLES T. PFLUEGER.

DISCLAIMER 1,871,386.—*Charles T. Pflueger*, Akron, Ohio. FISHING REEL. Patent dated August 9, 1932. Disclaimer filed September 29, 1939, by the assignee, *The Enterprise Manufacturing Company*.

Hereby enters this disclaimer to claims 3 and 4 of the specification.

[*Official Gazette October 24, 1939.*]